United States Patent
Kojima et al.

[11] Patent Number: 6,120,937
[45] Date of Patent: Sep. 19, 2000

[54] ELECTRODE FOR ALKALINE STORAGE BATTERY AND METHOD FOR MANUFACTURING THE SAME

[75] Inventors: Tamao Kojima; Munehiro Tabata; Tomoyuki Washizaki; Masakazu Tanahashi; Yoshiki Murakami, all of Osaka; Satoshi Kaida, Kyoto; Masayoshi Maruta, Kanagawa, all of Japan

[73] Assignee: Matsushita Electric Industrial Co., Ltd., Osaka, Japan

[21] Appl. No.: 09/076,254

[22] Filed: May 11, 1998

[30] Foreign Application Priority Data

May 15, 1997 [JP] Japan ................................ 9-125870

[51] Int. Cl.[7] .............................. H01M 4/28; H01M 4/32
[52] U.S. Cl. .................. 429/223; 429/236; 29/2
[58] Field of Search ...................... 429/235, 236, 429/233, 241, 242, 223; 29/2; 423/594

[56] References Cited

U.S. PATENT DOCUMENTS

| | | | |
|---|---|---|---|
| 4,844,948 | 7/1989 | Nakahori et al. | 429/223 X |
| 5,079,110 | 1/1992 | Nakahori et al. | 429/206 |
| 5,248,510 | 9/1993 | Lim et al. | 429/236 |
| 5,718,988 | 2/1998 | Asano et al. | 429/206 |

FOREIGN PATENT DOCUMENTS

| | | |
|---|---|---|
| 48-100627 | 12/1973 | Japan . |
| 59-78457 | 5/1984 | Japan ............................ H01M 4/80 |
| 60-216452 | 10/1985 | Japan . |
| 62-61271 | 3/1987 | Japan . |
| 62-90864 | 4/1987 | Japan . |
| 63-40255 | 2/1988 | Japan . |
| 63-128555 | 6/1988 | Japan . |
| 4-75255 | 3/1992 | Japan . |
| 5-151972 | 6/1993 | Japan ............................ H01M 4/80 |
| 1 504 892 | 3/1978 | United Kingdom . |

OTHER PUBLICATIONS

Communication from European Patent Office and attached Search Report.

*Primary Examiner*—Carol Chaney
*Attorney, Agent, or Firm*—Merchant & Gould P.C.

[57] ABSTRACT

In a positive electrode for an alkaline storage battery, a layer is formed between a porous substrate as a core material and an active material including nickel hydroxide filled into the porous substrate. The layer includes an oxide containing cobalt and nickel and/or a hydroxide containing cobalt and nickel. In the hydroxide, the average of an oxidation number of a metal is more than +II. The layer has a high electric conductivity while keeping the high corrosion resistance. A utilization rate of the active material can be improved due to the high electric conductivity. An alkaline storage battery including such an electrode has a good cycle property.

30 Claims, 8 Drawing Sheets

ELECTRODE FOR ALKALINE STORAGE BATTERY AND METHOD FOR MANUFACTURING THE SAME

FIELD OF THE INVENTION

The present invention relates to an electrode for an alkaline storage battery, a method for manufacturing such an electrode and an alkaline storage battery having such an electrode as a positive electrode.

BACKGROUND OF THE INVENTION

A porous sintered substrate for an electrode used in an alkaline storage battery is conventionally produced by sintering a metal plate with slurry in a reducing atmosphere including hydrogen. The metal plate, composed of iron or the like, constitutes a core of the porous substrate. The slurry, including a metal powder such as a nickel powder and a resin, is applied to the metal plate, and dried before sintering.

The porous sintered substrate is immersed in a nickel nitrate solution to fill nickel hydroxide as an active material into pores in the substrate by a chemical method or an electrochemical method. The chemical method is also called a chemical impregnating method, in which the porous sintered substrate is immersed in a nickel nitrate solution of high concentration, followed by drying and immersing in an alkaline solution to change the nitrate in the substrate into the nickel hydroxide. Several repetitions of the above operation are usually required to obtain a sufficient amount of nickel hydroxide.

The electrochemical method is also called an electrodeposition impregnating method, in which the porous sintered substrate is immersed in a nickel nitrate solution of high concentration, followed by cathodic electrolysis of the substrate in the solution. The electrolysis reduces a nitrate group in the pore within the porous substrate to generate an ammonium ion as shown in a reaction formula [1], resulting in a rise in a pH value. As a consequence, nickel hydroxide is precipitated in the pore within the substrate as shown in a reaction formula [2].

$$NO_3^- + 9H^+ + 8e^- \rightarrow NH_4OH + 2H_2O \quad [1]$$

$$Ni^{2+} + 2OH^- \rightarrow Ni(OH)_2 \quad [2]$$

However, a nickel nitrate solution of high concentration corrodes a sintered nickel body in the substrate in the chemical or electrochemical method because the solution is highly corrosive. Such a fragile electrode makes a cycle property of the alkaline storage battery worse.

For improving such a deterioration of the electrode, Japanese Patent Publication (Tokkai-Sho) No.48-100627 discloses a protective layer formed on the sintered nickel body. The protective layer is composed of nickel silicate, nickel phosphate or nickel carbonate. Japanese Patent Publication (Tokkai-Sho) No.59-78457 discloses a nickel oxide layer on the sintered nickel body, formed by treating the sintered substrate with a gas including oxygen. Japanese Patent Publication (Tokkai-Sho) No.62-61271, Japanese Patent Publication (Tokkai-Sho) No.63-128555 and Japanese Patent Publication (Tokkai-Hei) No.4-75255 disclose a cobalt oxide layer as a protective layer on the sintered nickel body. According to these publications, the cobalt layer can be formed by pyrolyzing a cobalt salt.

The protective layers disclosed in the above publications can give high resistance to corrosion so that the layers may be effective to prevent the corrosion of the sintered nickel body. However, the layers have low electric conductivity so that the utilization rate of the active material falls. In the case of the electrochemical method, nickel hydroxide is not precipitated on the protective layer because of its low electric conductivity but clustered only on the nickel surface that appears by fracturing the protective layer partially while carrying the substrate or operating. Moreover, the electrolysis rate (a rate of an amount of deposited nickel hydroxide to an input of an electric charge) drops due to the protective layer.

SUMMARY OF THE INVENTION

An object of the present invention is, in the light of the situation as described above, to provide an electrode for an alkali storage battery that has high corrosion resistance to a nickel nitrate solution and a high utilization rate of an active material, and an alkali storage battery that uses such an electrode as a positive electrode and shows a good cycle property. Another object of the invention is to provide a method for manufacturing such an electrode in which the corrosion of the porous sintered substrate is suppressed, and an electrolysis rate is improved and an active material is uniformly filled into the pores within the substrate when the electrochemical method is applied.

An electrode for an alkaline storage battery of the invention includes a layer including a compound containing cobalt and nickel. The compound is preferably composed of an oxide and/or a hydroxide containing cobalt and nickel. The hydroxide is characterized in that the average of an oxidation number of a metal bonding to a hydroxyl group in the hydroxide (hereinafter, referred to as "an average oxidation number") is more than two (+II).

An electrode for an alkaline storage battery of the present invention has a porous substrate, an active material including nickel hydroxide filled into the porous substrate, and the layer as described above between the porous substrate and the active material.

According to the above electrode, it is possible to raise the utilization rate of the active material while keeping a high corrosion resistance to a nickel nitrate solution. An alkali storage battery of the present invention including the above electrode as a positive electrode can show an improved cycle property.

A method for manufacturing an electrode of the present invention includes a step of forming the layer as described above on a porous substrate before filling the active material into the porous substrate.

According to the above method, it is possible to decrease the corrosion of the porous sintered substrate when the active material is filled into the substrate and to fill the active material into the porous substrate with a high electrolysis rate in the electrochemical method.

These and other advantages of the present invention will become apparent to those skilled in the art upon reading and understanding the following detailed description with reference to the accompanying figures.

DETAILED DESCRIPTION OF THE PREFERRED EMBODIMENT

Figure 1:
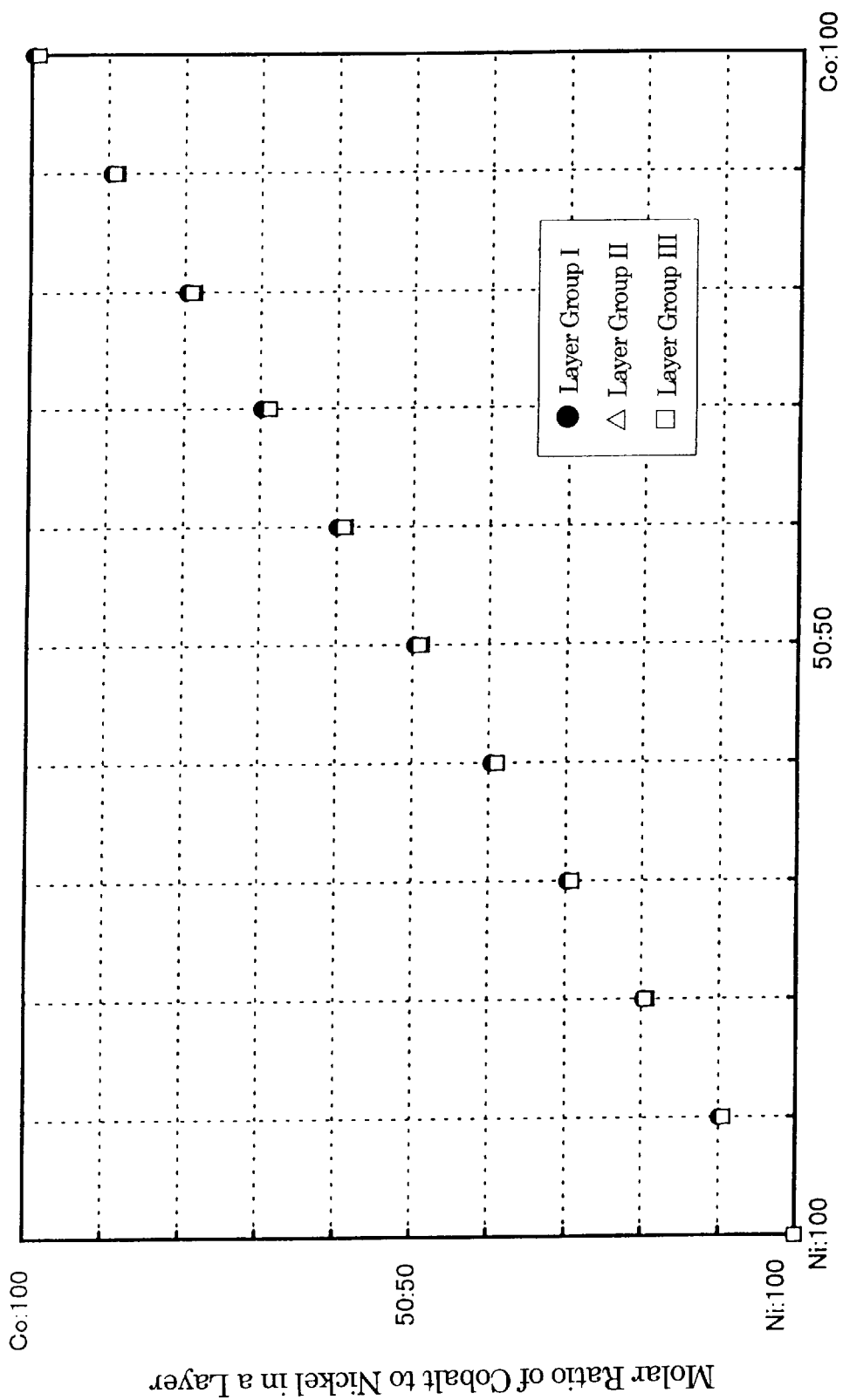
FIG. 1 is a graph showing the relationship between a molar ratio of cobalt to nickel in a nitrate solution and a molar ratio of cobalt to nickel in a layer formed from the solution.

An electrode for an alkaline storage battery of the present invention includes a layer showing an improved electric conductivity and a high corrosion resistance. In one embodiment of the invention, the layer includes an oxide containing cobalt and nickel. In another embodiment of the invention, the layer includes a hydroxide containing cobalt and nickel. The hydroxide has an average oxidation number of more than two. Such a layer has a high electric conductivity, which is preferably 1 S/cm, more preferably 10 S/cm, to improve the utilization rate of the active material such as nickel hydroxide.

The layer preferably includes an oxide containing cobalt and nickel. The oxide shows a higher electric conductivity and a higher corrosion resistance than those of a hydroxide containing cobalt and nickel when the molar ratio of cobalt to nickel in the compounds is equal to each other. Therefore, the utilization rate and the cycle property can be improved further.

On the other hand, a hydroxide that contains cobalt and nickel having the average oxidation number of more than two is inferior to the oxide in the corrosion property to some extent. However, the hydroxide is effective in preventing the porous sintered substrate from deteriorating while the active material is filled into the substrate. The advantage of the hydroxide is that it can be produced at a comparatively low temperature.

The layer preferably contains cobalt and nickel in a molar ratio between six to four and eight to two. Such a molar ratio can improve the electric conductivity so that a utilization rate of the active material rises.

In the method for manufacturing an electrode for an alkaline storage battery, the layer as described above is formed on the porous substrate before filling an active material into the porous sintered substrate. The layer can be formed by contacting a solution containing cobalt and nickel with the porous substrate, followed by heating the substrate.

In order to adjust the ratio of cobalt to nickel in the layer, the solution preferably contains cobalt and nickel in a molar ratio between six to four and eight to two. An inorganic salt such as a chloride salt and a sulfate salt or an organic salt such as an acetate salt, a formate salt, an oxalate salt, a citrate salt and a 2-ethylhexane salt can be used for the salt containing cobalt or nickel. However, it is preferred to use a nitrate salt including cobalt or nickel, because the nitrate has comparatively low temperature to be pyrolyzed and easy to be purchased at a reasonable price. The solvent for the solution is not limited to water, but an organic solvent such as alcohol can also be used according to the property of the solute.

The concentration of the total amount of cobalt and nickel is preferably 0.01 M [mol/l] or more.

The porous substrate is preferably contacted with an alkaline solution after the contact with the above solution. When heating the substrate that has been contacted with the solution containing cobalt and nickel and the alkaline solution, dissolved oxygen that has been contained in the alkaline solution can oxidize a metal such as cobalt and nickel. Sodium hydroxide, potassium hydroxide, lithium hydroxide or the like can be used for preparing the alkaline solution. In such a case, the substrate is preferably heated at a temperature of 120° C. or more.

When contacting with an alkaline solution, the salts containing cobalt and nickel are converted to the hydroxides. Such a substitution by a hydroxyl group can prevent an organic or inorganic acid of high corrosiveness from being generated during the heat treatment. Thus, apparatus for heat treatment can be easily designed.

The porous substrate can be rinsed with water after contacting the substrate with an alkaline solution. When contacting with an alkaline solution, the salts containing cobalt and nickel are converted to the hydroxides and organic or inorganic salts are generated as by-products. In the step of rinsing, the by-products and a surplus alkaline component can be washed away. Therefore, such a substitution by a hydroxyl group and a rinse with water can prevent an organic or inorganic acid of high corrosiveness and an alkaline mist from being generated during the heat treatment. Thus, apparatus for heat treatment can be easily designed.

In order to form a layer composed of the above mentioned oxide, the substrate is preferably heated at a temperature of 250° C. or more.

The porous sintered substrate available for the electrode of the invention is not particularly limited, and the substrate conventionally used for the electrode can be utilized. As a method for filling the active material into the substrate, a combination method of a chemical method and an electrochemical method can be used as well as each of these methods individually.

EXAMPLES

Slurry was made by adding an aqueous medium containing methyl cellulose to a carbonyl nickel powder. The slurry was coated on a nickel-plated perforated steel sheet at a thickness of 60 μm. After drying the steel sheet at 100° C., it was heated at 1000° C. in a reducing atmosphere including hydrogen to obtain a porous sintered substrate. The layers of sintered nickel were formed on the steel sheet, each of which had a thickness of about 300 μm and a porosity of about 80%.

A layer of an oxide and/or a hydroxide containing cobalt and nickel was formed on the substrate by methods as follows:

(A First Method for Forming the Layer)

After immersing the substrate in an aqueous solution of cobalt nitrate and nickel nitrate for three minutes, the substrate was heated at a predetermined temperature for 10 minutes in air to obtain a porous substrate with the layer. Hereinafter, the layers formed by the first method are referred to as "Layer Group I".

(A Second Method for Forming the Layer)

After immersing the substrate in an aqueous solution of cobalt nitrate and nickel nitrate for three minutes, the substrate was dried at 80° C. for 60 minutes in a vacuum. The dried substrate was immersed in a 6.5M aqueous solution of sodium hydroxide for 30 minutes, followed by heating the substrate at a predetermined temperature for 10 minutes in air to obtain a porous substrate with the layer. Hereinafter, the layers formed by the second method are referred to as "Layer Group II".

(A Third Method for Forming the Layer)

After immersing the substrate in an aqueous solution of cobalt nitrate and nickel nitrate for three minutes, the substrate was dried at 80° C. for 60 minutes in a vacuum. The dried substrate was immersed in a 6.5M aqueous solution of sodium hydroxide for 30 minutes. In this method, the substrate was washed with water for 30 minute before the heat treatment. In the heat treatment, the substrate was heated at a predetermined temperature for 10 minutes in air to obtain a porous substrate with the layer. Hereinafter, the layers are referred to as "Layer Group III".

Some aqueous solutions were applied in each method, which include cobalt nitrate and nickel nitrate in different molar ratios.

FIG. 1 shows the relationship between a molar ratio of cobalt to nickel in the aqueous solution of the nitrate and a molar ratio of cobalt to nickel in the layer formed on the substrate by the above three methods. As can be seen in FIG. 1, the two molar ratios give about the same value.

The molar ratio in the layer was measured by a following method.

The porous sintered substrate with the layer was dipped in a 50 weight % aqueous solution of acetic acid at 80° C. for five minutes. The amounts of cobalt and nickel in the acetic acid solution were measured by inductively coupled plasma (ICP) emission spectrometry to determine the molar ratio.

The layers also were formed on a ceramic substrate by the above three methods to examine an electric conductivity. At the same time, a composition ratio in the layer was measured. The composition ratio was measured by an X-ray diffraction analysis, while the electric conductivity was determined by a sheet resistivity measuring apparatus.

As a result of the X-ray analysis, it was confirmed that a heat treatment at a comparatively low temperature gave a composite hydroxide containing cobalt and nickel and that the oxidation number of the metal atoms in the layer had a tendency to increase as the heat-treatment temperature went up. When the temperature rose further, generation of an oxide containing cobalt and nickel was observed. The layer which had been heated at a temperature of 250° C. or more only showed diffraction peaks attributed to the oxide.

It also was confirmed that the temperature for generating the hydroxide with atoms having a higher average oxidation number or the oxide by the second method was lower than that by the first and three methods. It is believed that the difference is caused by an oxidization effect by dissolved oxygen in an alkaline solution. However, in the first and third methods, increasing a concentration of oxygen in the atmosphere during heat treatment makes it possible to oxidize the hydroxide in such a low temperature as that in the second method.

Figure 2:
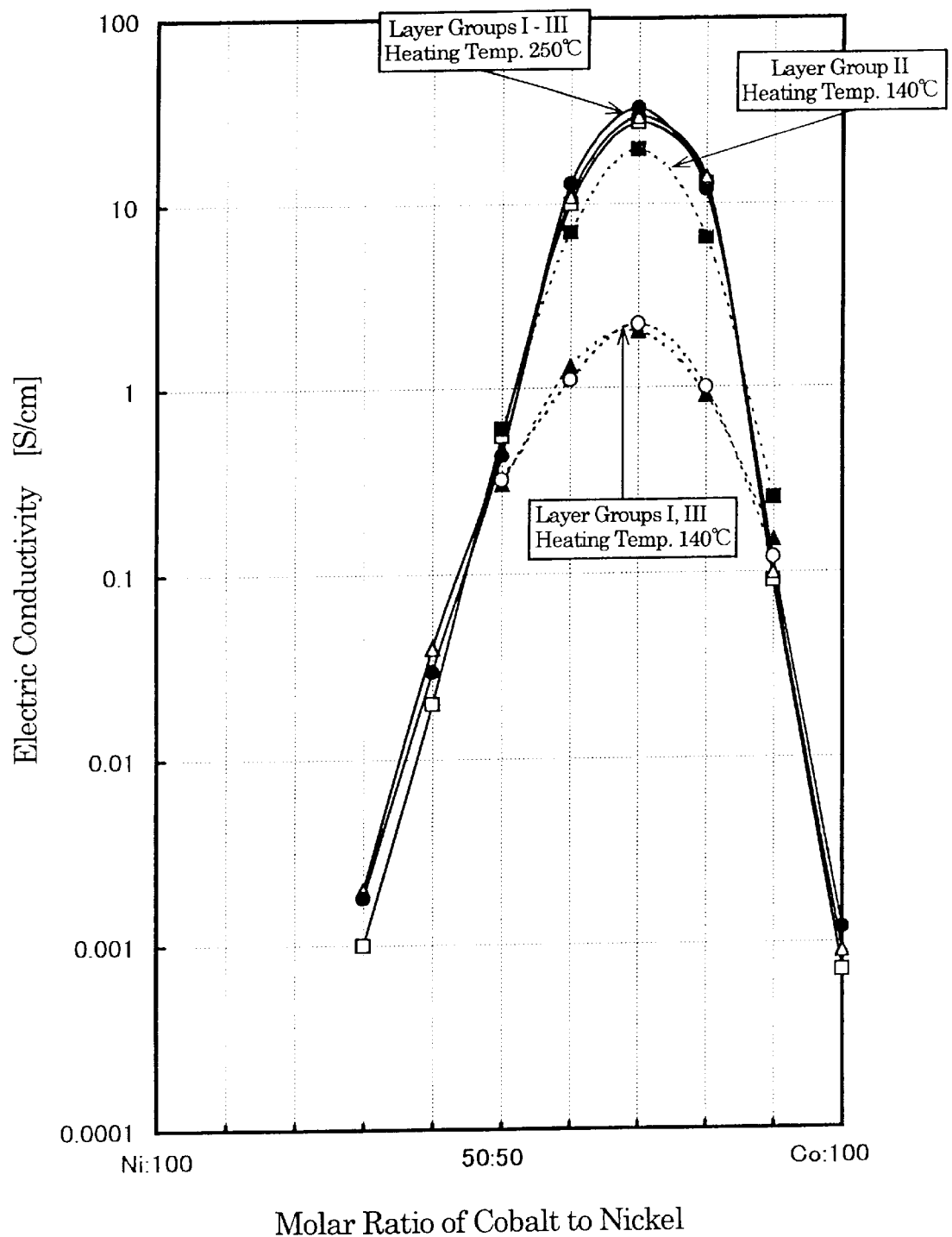
FIG. 2 is a graph showing an electric conductivity of a layer containing cobalt and nickel with respect to a molar ratio of the cobalt to the nickel.

FIG. 2 shows the electric conductivity of the layer containing cobalt and nickel with respect to a molar ratio of cobalt to nickel in the layer. The layers were formed by the heat treatment at 140° C. or 250° C. As can be seen in FIG. 2, the layers had a high conductivity in the range where the molar ratio of cobalt to nickel is between 6:4 and 8:2.

When heating the substrate at 140° C., Layer Group II had a comparatively higher electric conductivity than those of Layer Groups I and III. An X-ray analysis showed that Layer Group II had comparatively many hydroxides including atoms having a higher average oxidation number. When heating the substrate at 250° C., all of the layer groups showed a similar X-ray diffraction pattern and a similar electric conductivity. Therefore, a close interrelationship between the electric conductivity and the crystal structure was suggested.

Figure 3:
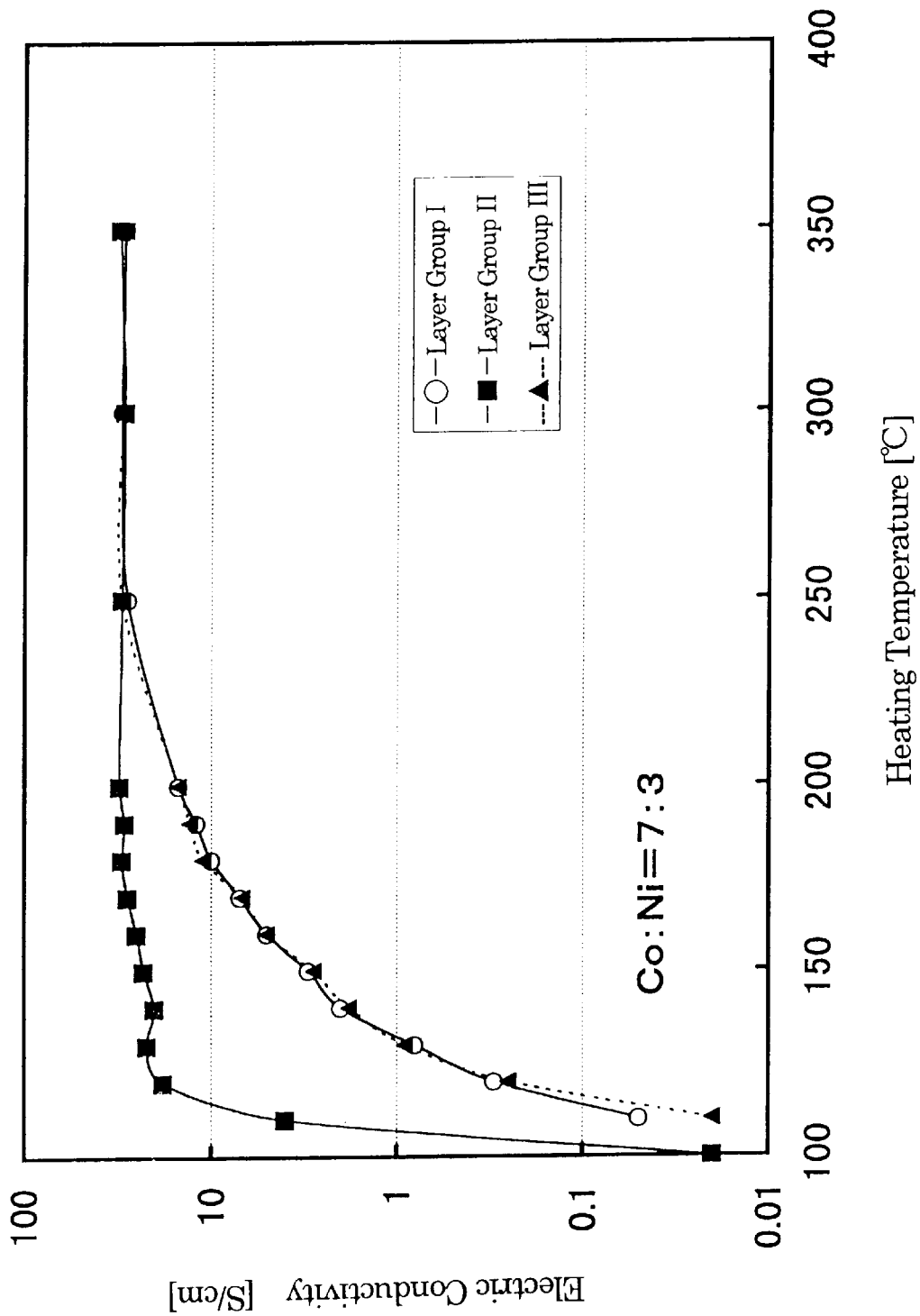
FIG. 3 is a graph showing an electric conductivity of a layer containing cobalt and nickel with respect to a temperature in the heat treatment for forming the layer.

FIG. 3 shows the electric conductivity of the layer containing cobalt and nickel with respect to a temperature in the heat treatment, where the molar ratio of cobalt to nickel in an aqueous solution of the nitrates is seven to three. As can be seen in FIG. 3, the electric conductivity increased as the temperature rose. When the temperature was 250° C. or more, the electric conductivity reached the highest and about the same value. For Layer Group II, the electric conductivity went up more sharply compared to Layer Groups I and III in a comparatively low temperature and reached at least 10 S/cm at 120° C. or more.

As a result of the X-ray analysis, it was confirmed that higher temperature gave a composite hydroxide containing cobalt and nickel with a higher average oxidation number. Therefore, such a composite hydroxide seems to contribute to rising electric conductivity.

Heat treatment at a temperature of 250° C. or more caused the layers showing only diffraction peaks attributed to $Co_2NiO_4$. Considering also the result shown in FIG. 2, the electric conductivity more than 10 S/cm seems to be caused by the generation of $Co_2NiO_4$. For Layer Group II, a composite hydroxide containing cobalt and nickel with a higher oxidation number and $Co_2NiO_4$ was observed in the layer that had been heated at a comparatively low temperature.

Figure 4:
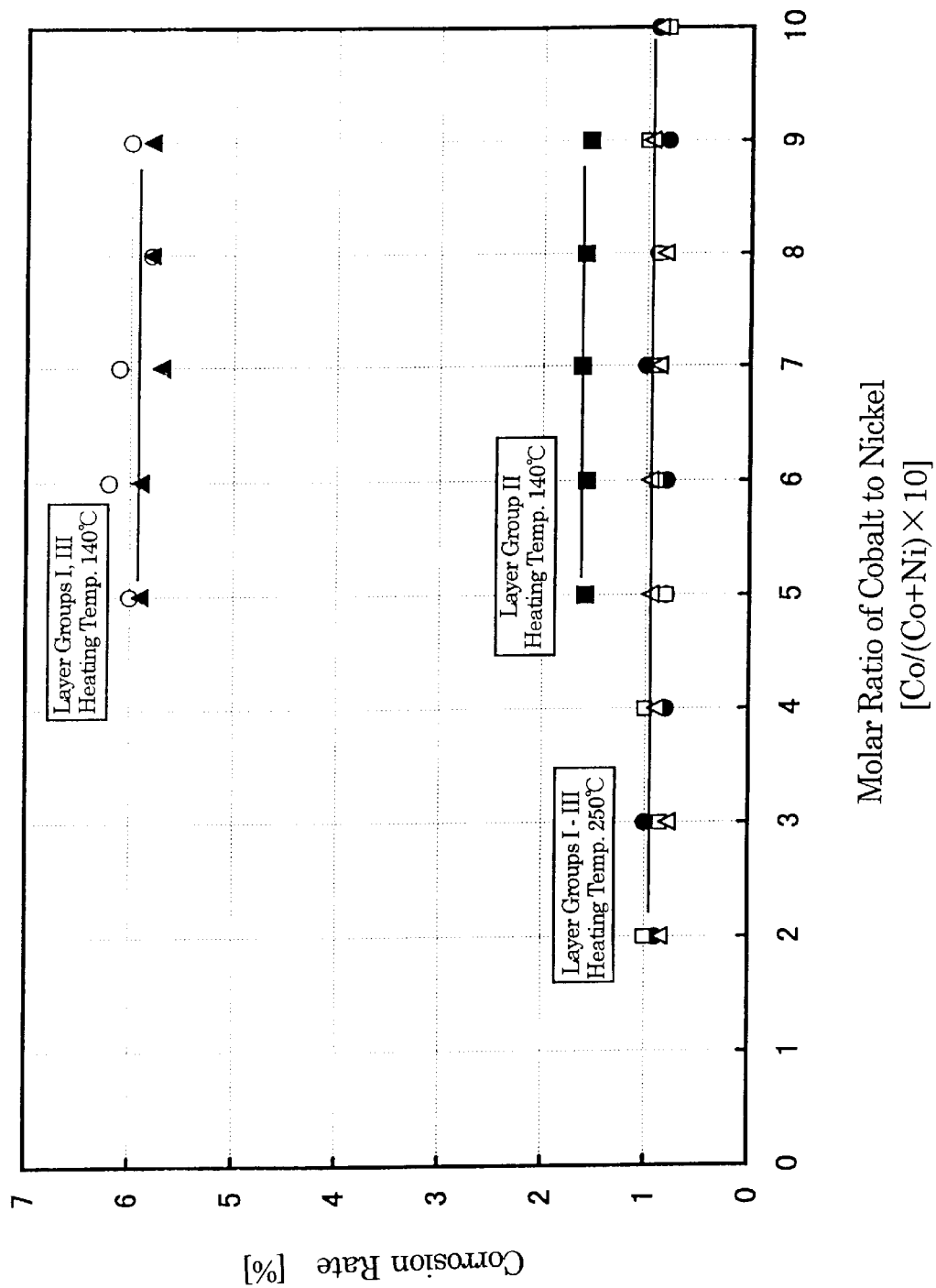
FIG. 4 is a graph showing a corrosive dissolving rate of a porous sintered substrate with respect to a molar ratio of cobalt to nickel in the layer.
Figure 5:
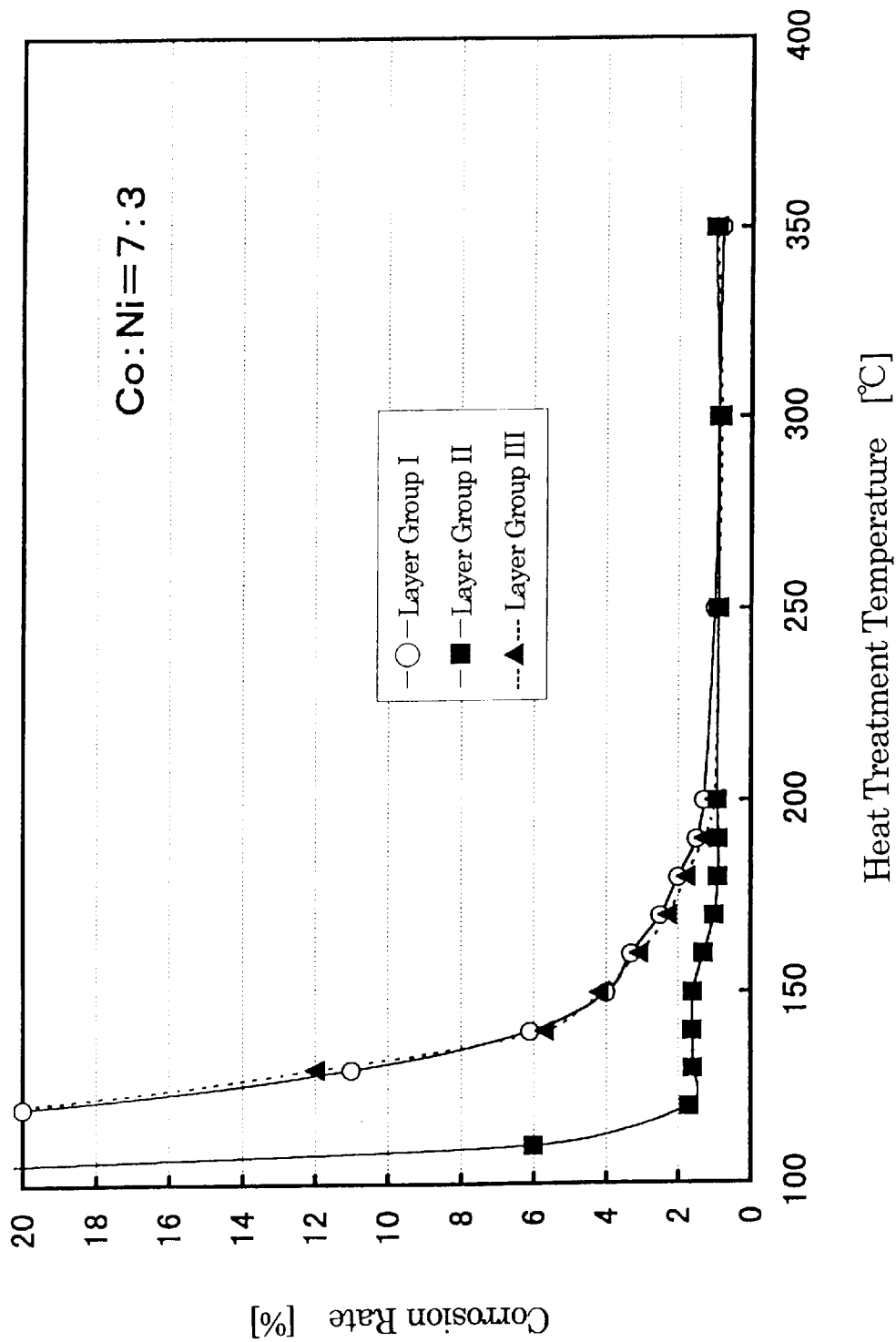
FIG. 5 is a graph showing a corrosive dissolving rate of a porous sintered substrate with respect to a temperature in the heat treatment for forming the layer.

FIGS. 4 and 5 show the result of the corrosion resistance test on the porous sintered substrate with the layers of Layer Groups I–III.

In the corrosion resistance test, a corrosion rate was determined by the decrease in weight of the porous sintered substrate. The substrate was immersed in a 4.5M aqueous solution of nickel nitrate at pH 1.0, kept at 80° C. for 60 minutes, and then washed and dried before measuring its weight.

FIG. 4 shows a corrosion rate of a porous sintered substrate with respect to a molar ratio of cobalt to nickel in the layers, which was heated at 140° C. or 250° C. As can be seen in FIG. 4, the molar ratio did not affect the corrosion rate in the range where the molar ratio of cobalt to nickel was between 10:0 and 2:8.

FIG. 5 shows a corrosion rate of a porous sintered substrate with respect to a temperature in the heat treatment for forming the layers, where the molar ratio of cobalt to nickel in the aqueous solution of the nitrates used for forming the layers was 7:3. As shown in FIG. 5, the corrosion rate decreased as the temperature rose. When the temperature was 250° C. or more, the rate reached about the same value of 1% or less. For Layer Group II, the corrosion rate was improved more than those of Layer Groups I and III in a comparatively low temperature.

As in the case of the electric conductivity, a composite hydroxide containing cobalt and nickel with a higher average oxidation number, generated as the temperature rose, seems to contribute to improving the corrosion resistance. Similarly, the corrosion rate of 1% or less seems to be caused by $Co_2NiO_4$, generated by heating at 250° C. or more. For Layer Group II, the corrosion rate reached 2% or less in the range where the heat treatment temperature was 120° C. or more.

Figure 6:
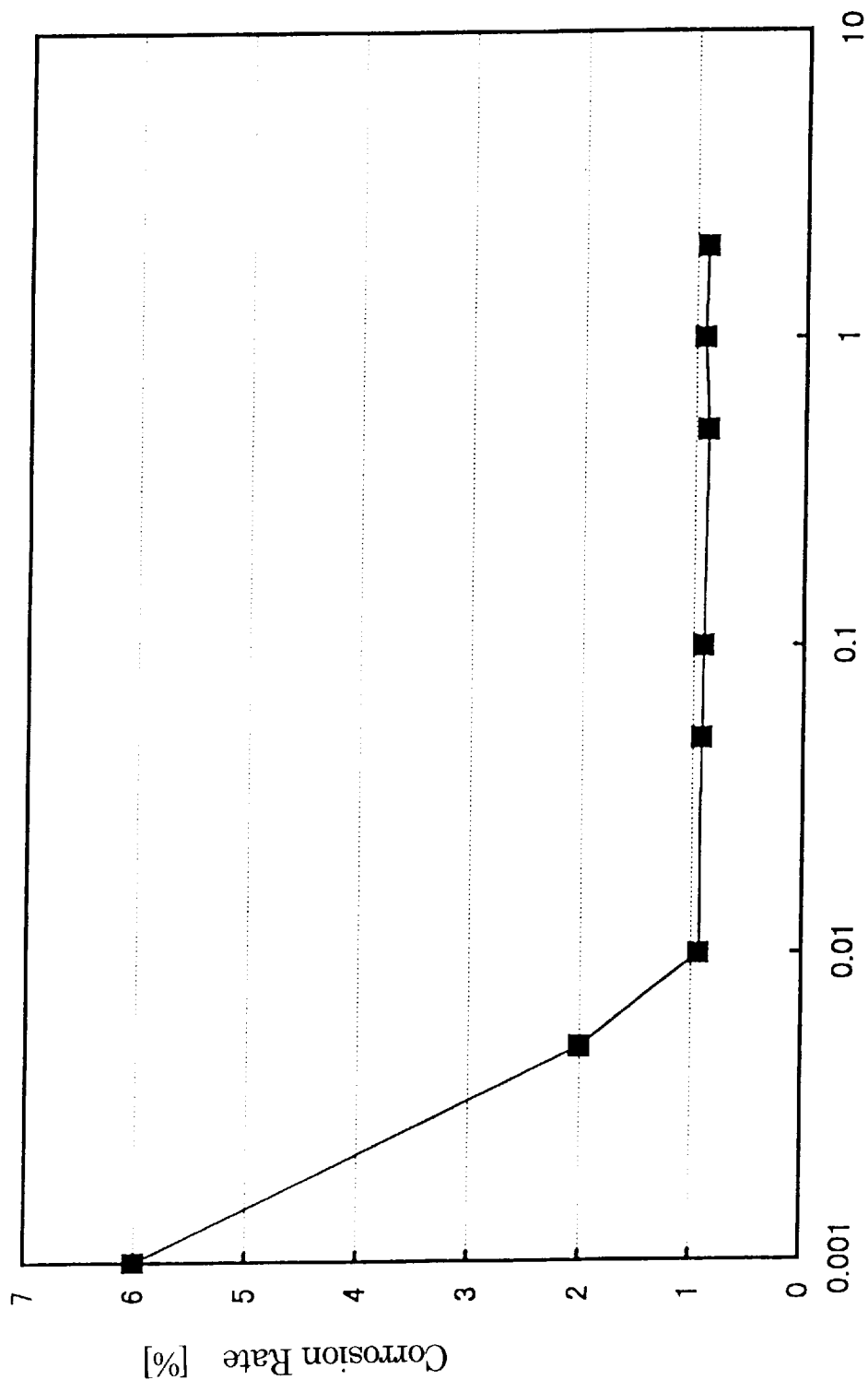
FIG. 6 is a graph showing a corrosive dissolving rate of a porous sintered substrate with respect to a concentration of cobalt and nickel in a nitrate solution.

FIG. 6 shows a corrosive rate of the porous sintered substrate with respect to a concentration of cobalt and nickel in the aqueous solution of the nitrates, where the molar ratio of cobalt to nickel was 7:3 and the heat treatment temperature was 250° C. As can be seen in FIG. 6, the total concentration of cobalt and nickel of 0.01M or more provided sufficient corrosion resistance.

As described above, the layer including the oxide containing cobalt and nickel and/or the hydroxide containing the same in which the average oxidation number of the included atoms is more than two is formed on the porous sintered substrate so that the electric conductivity can be improved while keeping the corrosion resistance to a nickel nitrate solution sufficiently high. Such a high electric conductivity is expected to fill an active material into the pores within the porous sintered substrate uniformly with high electrolysis efficiency in the electrodeposition step. Therefore, an alkaline storage battery with high corrosion resistance and good cycle property can be produced by using such an electrode as a positive electrode.

In order to confirm the effect of the above electrode, alkaline storage batteries including the above substrate were produced to investigate the battery capacity and the cycle property.

First, the layers were formed on the porous sintered substrates by the second method for forming the layer. In this case, the layers were prepared from the aqueous solutions of the nitrates in which the molar ratios of cobalt to nickel are different so that each of the layers had a different composition. The temperature in the heat treatment was 140° C. or 250° C. The untreated substrate without the layer also was prepared as a comparative example.

An active material was filled into the substrate with or without the layer by the chemical impregnating method. After the substrates were dipped in an aqueous solution of 4.5M nickel nitrate and 0.1M cobalt nitrate kept at 80° C. for three minutes, the substrates were dried at 80° C. for 90 minutes. The substrates with the nitrates were immersed in a 6.5M aqueous solution of sodium hydroxide at 80° C. Such a step for filling the active material was repeated seven times to prepare the electrodes for an alkaline storage battery.

Then, a hydrogen storage alloy-based negative electrode ($MmNi_{3.55}Mn_{0.4}Al_{0.3}Co_{0.75}$) which has a sufficiently large capacity, a separator (nonwoven fabric of polypropylene), an alkaline electrolyte potassium hydroxide) and each of the above electrodes as a positive electrode were combined to prepare an alkaline storage battery with a nominal capacity of 1.3 Ah. The same condition was applied to the manufacture of each of the battery.

The capacity of each alkaline storage battery was measured after 12A charging and 12A discharging. The battery was charged for six minutes, while a cutting voltage in discharging was 0.8 V. The cycle of 12A charging/12A discharging was repeated to investigate the cycle property.

Figure 7:
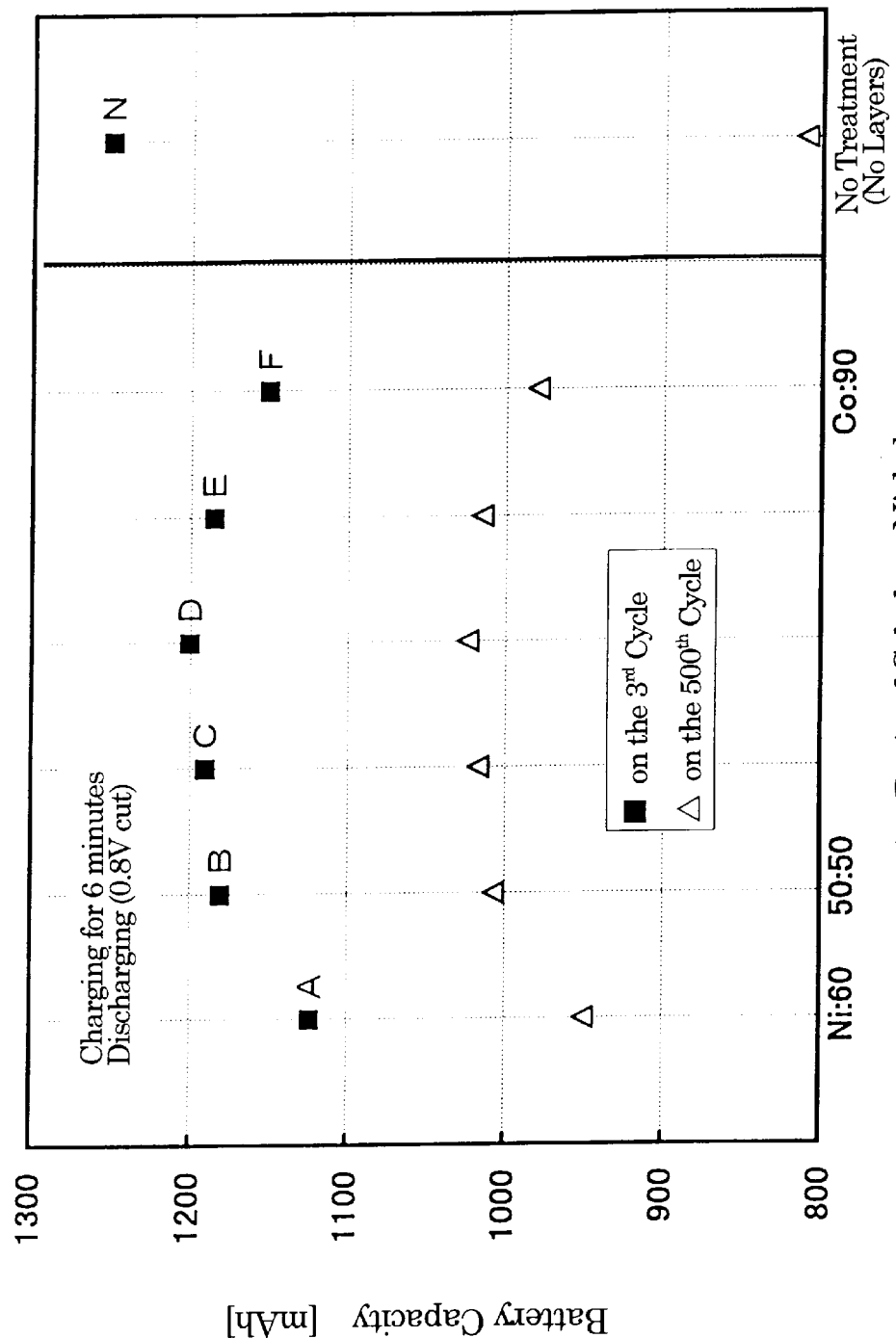
FIG. 7 is a graph showing a cycle property of exemplary alkaline storage batteries of the present invention and a conventional alkaline storage battery.
Figure 8:
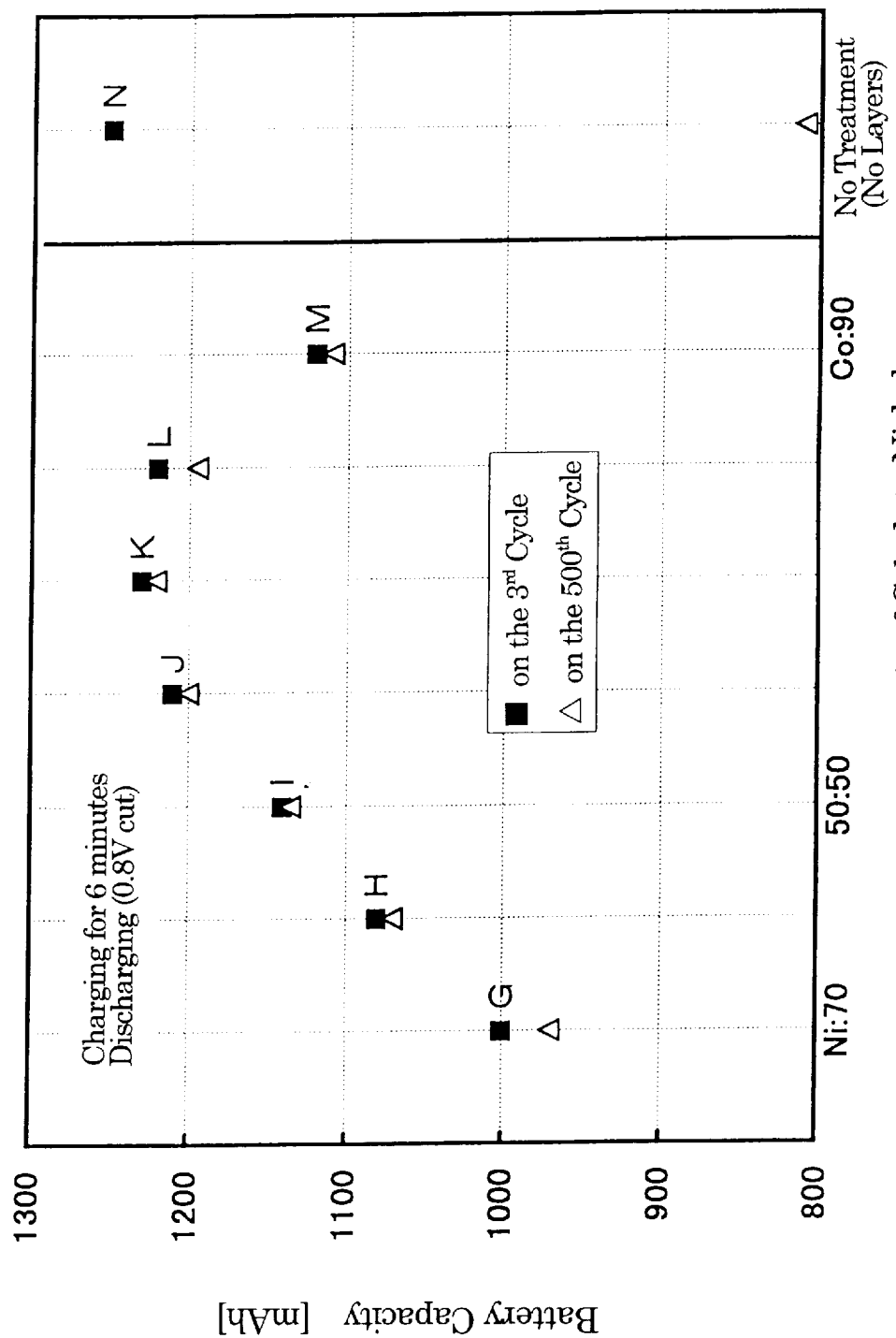
FIG. 8 is a graph showing a cycle property of exemplary alkaline storage batteries of the present invention and a conventional alkaline storage battery.

FIGS. 7 and 8 show battery capacities at the third cycle and the 100th cycle. The alkaline storage batteries (A) to (F) in FIG. 7 include the electrodes that had been heated at 110° C., while the alkaline storage batteries (G) to (M) in FIG. 8 include the electrodes that had been heated at 250° C. The alkaline storage battery (N) includes the electrode without the layer as a positive electrode.

As can be seen in FIGS. 7 and 8, the molar ratio of cobalt to nickel in the layer included in the electrode had an influence on the capacity of the alkaline storage battery. When the molar ratio is between 6:4 and 8:2, the alkaline storage batteries gave a larger capacity. The batteries including the electrode that had been heated at 250° C. gave a larger capacity. As can be seen in the above result, the layer containing cobalt and nickel in such a molar ratio that the layer has a high electric conductivity can provide an alkaline storage battery with a large capacity.

On the other hand, the molar ratio of cobalt to nickel in the layer included in the electrode had little influence on the decrease in the battery capacity after the above cycle. However, the alkaline storage batteries including the electrode that had been heated at 250° C. showed a gentle decrease compared to those including the electrode that had been heated at 110° C. As can be seen in this result and that as described above, the layer with high corrosion resistance can provide an alkaline storage battery with a good cycle property. In the alkaline storage battery [N] including the electrode without the layer, the battery capacity dropped excessively to about 65% on the 500th cycle.

As described above, the above electrode can provide an alkaline storage battery with a high utilization rate of the active material and a good cycle property.

The effect on electrodeposition in the electrochemical method was examined as follows.

First, the layers were formed on the porous sintered substrates by the second method for forming the layer. As in the case of the above layers, the layers were prepared from the aqueous solutions of the nitrates in which the molar ratios of cobalt to nickel are different so that each of the layers had a different composition. The temperature in the heat treatment was 250° C.

The active material was filled into the substrate by the electrochemical method. The substrates with the layers were immersed in an aqueous solution of 4.5M nickel nitrate kept at 80° C. to fill nickel nitrate by a cathodic reduction.

In order to investigate the condition of the nickel hydroxide in the substrate after the electrodeposition, the cross section of the substrate was observed with an electron microscope. When the molar ratio of cobalt to nickel was between 6:4 and 8:2, the nickel hydroxide was filled uniformly in the area extending from the central portion near the nickel-plated perforated steel sheet to the surface of the substrate. On the other hand, when the molar ratio was out of the above range, the nickel hydroxide was filled nonuniformly, as is in the case of the porous sintered substrate covered with nickel oxide. In this case, the nickel hydroxide was packed near the surface, while only a small amount of it existed inside.

Similarly, when the molar ratio of cobalt to nickel was between 6:4 and 8:2, the electrolysis efficiency was high due to the high electric conductivity of the porous sintered substrate. Corrosion was not observed in any of the substrates, which indicated a high corrosion resistance of the substrates.

In order to confirm the effect of the layer, the electrodeposition as described above was applied to the substrate without the layer. Such a substrate provided a high electrolysis efficiency due to its high electric conductivity and the uniformity of nickel hydroxide. However, the sintered nickel bodies in the substrate were fragile due to their low corrosion resistance.

A positive electrode, a separator and an alkaline electrolyte are not limited to those used in the above example. For example, $Mg_2Ni$, $TiMn_{1.5}$ can also be applied as a negative electrode. A nonwoven fabric of polyamide can also be applied as a separator. Sodium hydroxide can also be applied as an alkaline electrolyte. Lithium hydroxide or the like can be added to an alkaline electrolyte according to a desired property of the electrolyte.

Although the alkaline storage batteries manufactured in the above example are nickel-hydrogen batteries, the present invention can be applied to other alkaline storage batteries such as a nickel-cadmium battery.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. An electrode for an alkaline storage battery, comprising:

a porous substrate, an active material including nickel hydroxide filled into the porous substrate, and a layer between the porous substrate and the active material, wherein the layer includes an oxide containing cobalt and nickel, wherein the layer contains cobalt and nickel in a molar ratio between six to four and eight to two.

2. An electrode according to claim 1, wherein the layer has an electric conductivity of 1 S/cm or more.

3. An electrode according to claim 1, wherein the layer has an electric conductivity of 10 S/cm or more.

4. An electrode according to claim 1, wherein the layer includes $Co_2NiO_4$.

5. A method for manufacturing an electrode for an alkaline storage battery, the electrode having a porous substrate and an active material including nickel hydroxide filled into the porous substrate, the method comprising forming a layer on a porous substrate before filling the active material into the porous substrate, wherein the layer includes an oxide containing cobalt and nickel, wherein the solution contains cobalt and nickel in a ratio between six to four and eight to two.

6. A method for manufacturing an electrode according to claim 5, comprising heating the porous substrate after contacting a solution containing cobalt and nickel with the porous substrate as a step for forming the layer.

7. A method for manufacturing an electrode according to claim 6, wherein the solution includes cobalt nitrate and nickel nitrate.

8. A method for manufacturing an electrode according to claim 6, wherein the total concentration of cobalt and nickel in the solution is 0.01M or more.

9. A method for manufacturing an electrode according to claim 5, comprising contacting a solution containing cobalt and nickel with the porous substrate, contacting an alkaline solution with the porous substrate, and heating the substrate in that order for forming the layer.

10. A method for manufacturing an electrode according to claim 9, wherein the substrate is heated at 120° C. or more.

11. A method for manufacturing an electrode according to claim 5, comprising contacting a solution containing cobalt and nickel with the porous substrate, contacting an alkaline solution with the porous substrate, rinsing the substrate with water, and heating the substrate in that order for forming the layer.

12. A method for manufacturing an electrode according to claim 5, wherein the substrate is heated at 250° C. or more.

13. An alkaline storage battery comprising a positive electrode, a negative electrode, a separator between the positive electrode and the negative electrode, and an alkaline electrolyte, the positive electrode comprising a porous substance, an active material including nickel hydroxide filled into the porous substrate, and a layer between the porous substrate and the active material, wherein the layer includes an oxide containing cobalt and nickel, wherein the layer contains cobalt and nickel in a ratio between six to four and eight to two.

14. An alkaline storage battery according to claim 13, wherein the layer has an electric conductivity of 1 S/cm or more.

15. An alkaline storage battery according to claim 13, wherein the layer includes $Co_2NiO_4$.

16. An electrode for an alkaline storage battery, comprising:

a porous substrate, an active material including nickel hydroxide filled into the porous substrate, and a layer between the porous substrate and the active material, wherein the layer is formed directly on the porous substrate and includes at least one compound selected from the group of an oxide containing cobalt and nickel and a hydroxide containing cobalt and nickel, wherein in the hydroxide the average of an oxidation number of a metal is more than +II, wherein the layer contains cobalt and nickel in a molar ratio between six to four and eight to two.

17. An electrode according to claim 16, wherein the layer has an electric conductivity of 1 S/cm or more.

18. An electrode according to claim 16, wherein the layer has an electric conductivity of 10 S/cm or more.

19. An electrode according to claim 16, wherein the layer includes $Co_2NiO_4$.

20. A method for manufacturing an electrode for an alkaline storage battery, the electrode having a porous substrate and an active material including nickel hydroxide filled into the porous substrate, the method comprising forming a layer directly on a porous substrate before filling the active material into the porous substrate, wherein the layer includes at least one compound selected from the group of an oxide containing cobalt and nickel and a hydroxide containing cobalt and nickel, wherein in the hydroxide the average of an oxidation number of a metal is more than +II, wherein the layer contains cobalt and nickel in a molar ratio between six to four and eight to two.

21. A method for manufacturing an electrode according to claim 20, comprising heating the porous substrate after contacting a solution containing cobalt and nickel with the porous substrate as a step for forming the layer.

22. A method for manufacturing an electrode according to claim 21, wherein the solution includes cobalt nitrate and nickel nitrate.

23. A method for manufacturing an electrode according to claim 21, wherein the total concentration of cobalt and nickel in the solution is 0.01M or more.

24. A method for manufacturing an electrode according to claim 20, comprising contacting a solution containing cobalt and nickel with the porous substrate, contacting an alkaline solution with the porous substrate, and heating the substrate in that order for forming the layer.

25. A method for manufacturing an electrode according to claim 24, wherein the substrate is heated at 120° C. or more.

26. A method for manufacturing an electrode according to claim 20, comprising contacting a solution containing cobalt and nickel with the porous substrate, contacting an alkaline solution with the porous substrate, rinsing the substrate with water, and heating the substrate in that order for forming the layer.

27. A method for manufacturing an electrode according to claim 21, wherein the substrate is heated at 250° C. or more.

28. An alkaline storage battery comprising a positive electrode, a negative electrode, a separator between the positive electrode and the negative electrode, and an alkaline electrolyte, the positive electrode comprising a porous substrate, an active material including nickel hydroxide filled into the porous substrate, and a layer between the porous substrate and the active material, wherein the layer is formed directly on the porous substrate and includes at least one compound selected from the group of an oxide containing cobalt and nickel and a hydroxide containing cobalt and nickel, wherein in the hydroxide the average of an oxidation number of a metal is more than +II, wherein the layer contains cobalt and nickel in a molar ratio between six to four and eight to two.

29. An alkaline storage battery according to claim 28, wherein layer has an electric conductivity of 1 S/cm or more.

30. An alkaline storage battery according to claim 28, wherein the layer includes $Co_2NiO_4$.

* * * * *